US008378516B2

(12) United States Patent
Lee

(10) Patent No.: US 8,378,516 B2
(45) Date of Patent: Feb. 19, 2013

(54) CONTINUOUS WIND POWER SYSTEM WITH AUXILIARY BLADES

(76) Inventor: Tai Koan Lee, Mountain View, CA (US)

(*) Notice: Subject to any disclaimer, the term of this patent is extended or adjusted under 35 U.S.C. 154(b) by 248 days.

(21) Appl. No.: 12/755,435

(22) Filed: Apr. 7, 2010

(65) Prior Publication Data

US 2011/0248512 A1   Oct. 13, 2011

(51) Int. Cl.
*F03D 9/00* (2006.01)
(52) U.S. Cl. .......................... 290/44; 290/55
(58) Field of Classification Search ................ 290/1 R, 290/44, 54, 55; 415/916
See application file for complete search history.

(56) References Cited

U.S. PATENT DOCUMENTS

| 4,292,540 | A | 9/1981 | Thompson et al. | |
|---|---|---|---|---|
| 4,613,763 | A | 9/1986 | Swansen | |
| 4,684,817 | A | 8/1987 | Goldwater | |
| 4,764,683 | A | 8/1988 | Coombes | |
| 5,137,417 | A | 8/1992 | Lund | |
| 6,069,409 | A | 5/2000 | Fowler et al. | |
| 6,713,893 | B2 | 3/2004 | van der Horn | |
| 6,923,615 | B2 | 8/2005 | Crinion | |
| 6,984,899 | B1 | 1/2006 | Rice | |
| 2007/0040385 | A1 | 2/2007 | Uchiyama | |
| 2008/0150292 | A1 | 6/2008 | Fedor et al. | |
| 2009/0008939 | A1* | 1/2009 | Pare et al. | 290/44 |
| 2009/0146427 | A1* | 6/2009 | Lin | 290/52 |
| 2010/0032962 | A1 | 2/2010 | Kim et al. | |
| 2010/0109337 | A1 | 5/2010 | Wang et al. | |
| 2011/0156400 | A1* | 6/2011 | Lowe | 290/55 |

FOREIGN PATENT DOCUMENTS

| JP | 08-219005 | 8/1996 |
|---|---|---|
| JP | 11-125171 | 5/1999 |
| JP | 2000-069797 | 3/2000 |
| JP | 2004-028071 | 1/2004 |
| WO | WO 84/04362 | 11/1984 |
| WO | WO 2008/082094 A1 | 7/2008 |
| WO | WO 2009/144737 A1 | 12/2008 |
| WO | WO 2009/031008 | 3/2009 |
| WO | WO/2009/136413 | 11/2009 |
| WO | WO/2010/021655 | 2/2010 |

OTHER PUBLICATIONS

International Search Report, mailing date Jun. 20, 2011, for corresponding International Application No. PCT/US2011/031475. Written Opinion of the International Searching Authority, mailing date Jun. 20, 2011, for corresponding International Application No. PCT/US2011/031475.

* cited by examiner

*Primary Examiner* — Tho D Ta
(74) *Attorney, Agent, or Firm* — Intellectual Property Law Group LLP

(57) ABSTRACT

One embodiment of a continuous wind power system with auxiliary blades comprises of a general generator (150) and six sets of auxiliary blade sets (120) each propelled by a motor (130) of its own. Motors (130) are powered up by batteries, solar panels, or by a fraction of power generated by the generator (150). When motors (130) are powered, auxiliary blade sets (120) propel and create a force perpendicular to the extended arm (110B) to which it is mounted and resulting torque promotes rotary motion of the overall mounting device (110). A transmission device transfers the rotary motion of the mounting device (110) of auxiliary blade sets (120) and motors (130) to the shaft of generator (150A) and results in production of electricity. Clear advantages of this embodiment compared to current HAWT system includes: generation of electricity regardless of the amount of natural wind available and local weather condition, cheap and easy system to implement to improve on or replace existing wind farm, and increased accessibility to clean, green energy to meet growing demands for energy while protecting the environment.

14 Claims, 14 Drawing Sheets

CONTINUOUS WIND POWER SYSTEM WITH AUXILIARY BLADES

BACKGROUND

Energy has become one of the most discussed topics of the $21^{st}$ century. As technology continue to advance and individual dependence on gadgets increase, natural resources (such as oil, gas, and coal) continue to deplete—this phenomenon (limited source of energy with increased demands for use) will result in an increased consumer cost and pollution over time. Green, sustainable energy has therefore become the hottest topic among visionaries as possible source for solutions to these issues. Accordingly, more and more individuals, organizations, and governments are investing their money into green, sustainable energy sources, such as wind farms.

With expectations of great return, governments all over the world are allocating billions of tax payers' money to researchers and companies that build huge Mega-Watt (MW) wind turbines. Once built, world-wide investors put other billions of dollars into importing the huge turbines into different countries.

For example, 30 brand-new 2.5 MW GE wind turbines cost investors approximately over 150 million US dollars, excluding installation cost. However, many of these turbines turn right up in a second hand wind turbines market without even getting out of its original package. What are the reasons behind investors' decision to abandon a renewable energy plan as huge and as costly as this one?

Firstly, the climate changes around the world have become unpredictable, where extreme and fluctuating weather condition has limited normal wind turbine operation. Designers and manufacturers certainly take consideration of local climate when they design and build wind turbines for sites around the world. However, historical data can no longer predict future weather change as precisely as it did before, contributing to the incorrect estimate of predicted output of a wind farm in a specific location. In addition, most wind turbines underperform even if installed, as it fails to operate even when the wind speed has finally reached its cut-in speed.

Secondly, wind turbines are expensive. For example, 10 KW brushless generator costs $1000 to purchase, while a wind turbine with the same capacity costs as much as $10,000 to $50,000. Hence, it costs significantly more to set up a wind farm compared to a traditional power station. This is why it is imperative for wind farm owners and investors that governments implement favorable policies to ensure a market for wind energy. Without such policies, the recoup period for initial investment may be significantly lengthened or even be eliminated entirely. This may result in both withdrawal of existing investment and reduced amount of new investment for the field of clean, sustainable wind energy.

Lastly, even if the wind farm is set up with favorable government policies in place, the average recoup period for wind farm investment still can be as long as 10-15 years. The less-than-ideal operation time for most wind turbines is to blame for such long recoup period. An average operation time for a wind turbine is four hours each day. If the operation time is increased to eight hours a day, the turn-around time for investment can be shortened to 5 to 7.5 years. If the operation time of wind turbine can be increased furthermore, the turn-around time can be further shortened accordingly. The ideal solution is to make the wind turbines less expensive and easier to install, and increase its operation time to full 24-hour period each day.

ADVANTAGES

A few of the main advantages of this invention are as follows: it provides a cheap and easy way to replace or improve existing wind turbines in operation to maximize wind energy production. It increases energy output without increasing cost by keeping the wind turbines operating continuously regardless of weather conditions and availability of natural wind, and thus shortens the period of investment return from wind farm operations. Also, it gives a possibility to build a cheaper, smaller sized wind turbine alternative at a fraction of the cost of a functionally equivalent wind turbine. A wind farm built with the aforementioned wind turbine alternatives will increase accessibility for clean, sustainable wind energy for all, and adequately support growing demand for energy all awhile protecting the environment from harmful byproducts of common energy sources of today. Further specifics and advantages of this invention will be discussed in the following drawings and descriptions.

DRAWINGS

Figures

In the drawings, closely related figures have the same number but different alphabetic suffixes.

Figure 4A:
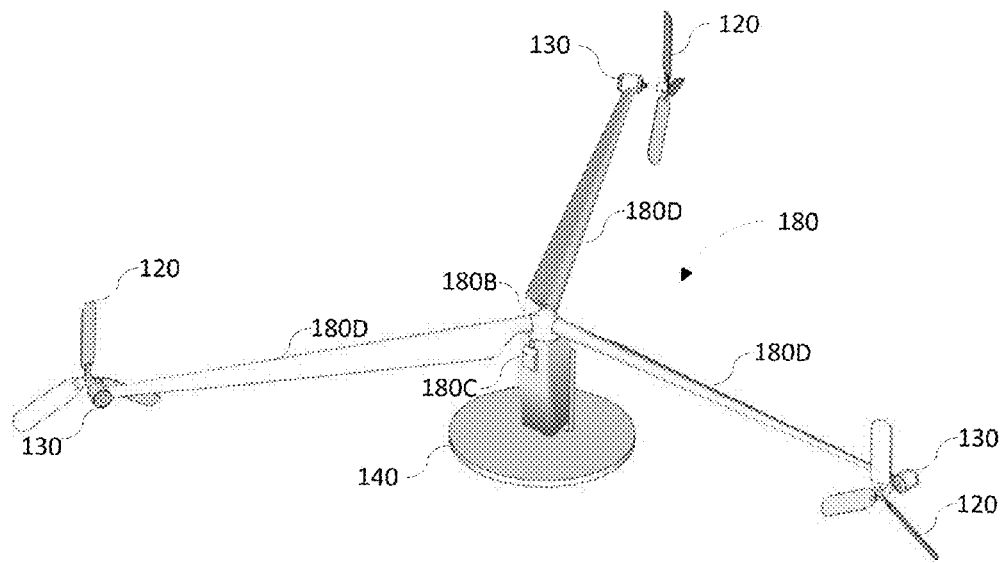
Figure 4B:
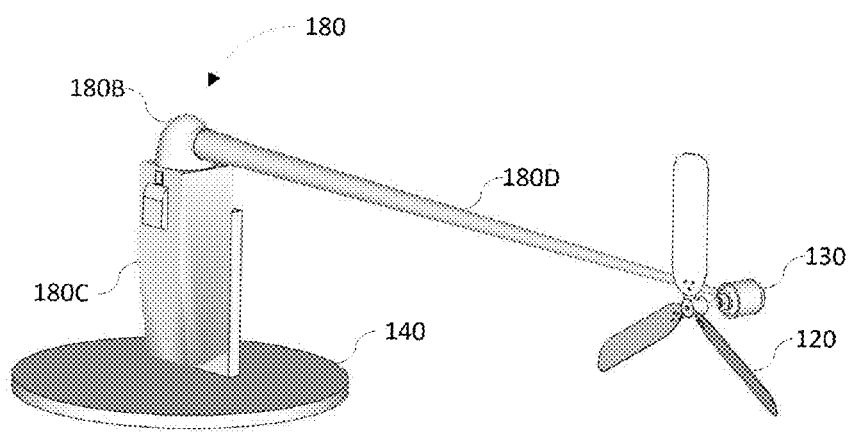
Figure 4C:
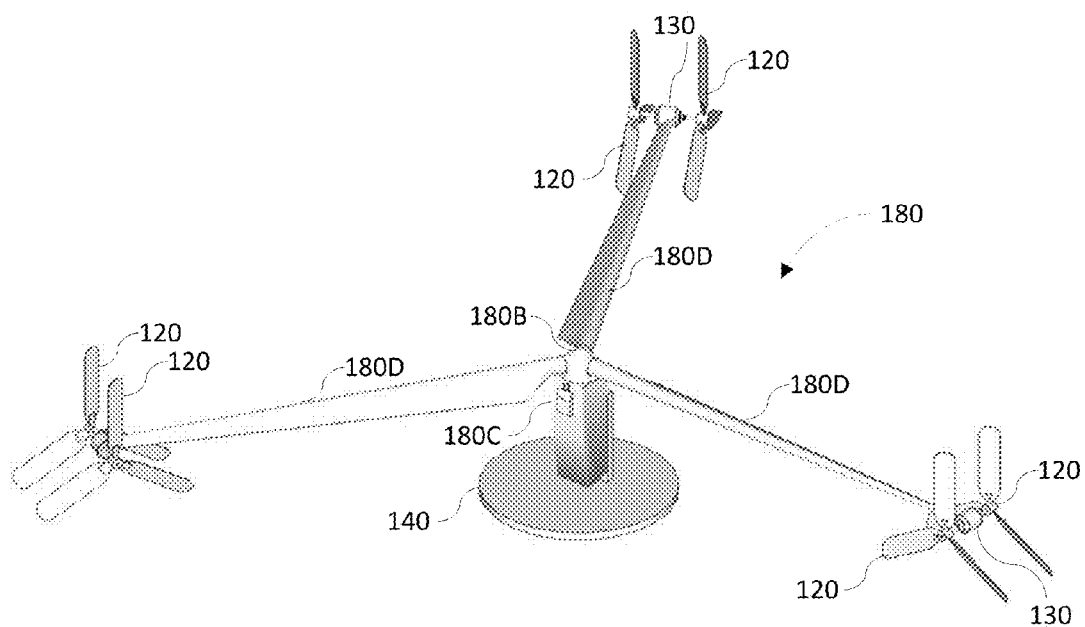

FIGS. 4A-4C show various embodiments with a HAWT installed on a horizontal base instead of a tower. The blades of the wind turbine are used as mounting devices for auxiliary blade sets and motors. These embodiments can be used to build wind turbine alternatives.

Figure 5:
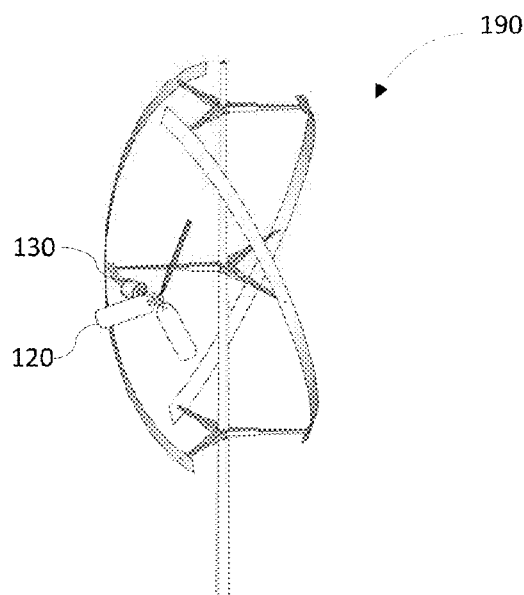

FIG. 5 shows an alternative embodiment using a vertical axis wind turbine (VAWT) with one blade of VAWT serving as a mounting device for an auxiliary blade sets and a motor. This embodiment can be used to modify and improve existing VAWT in operation.

Figure 6A:
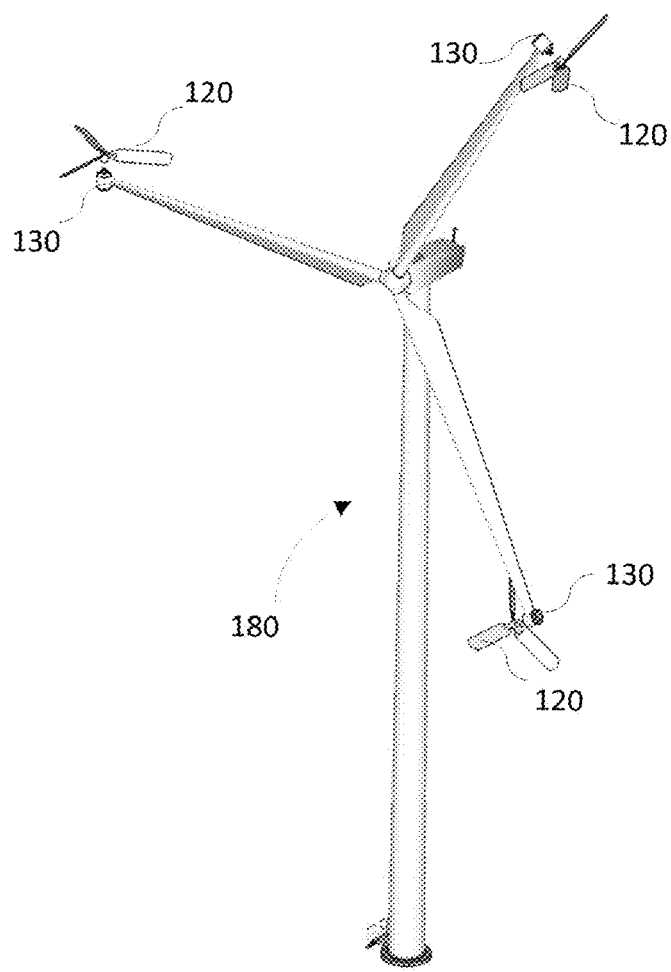
Figure 6B:
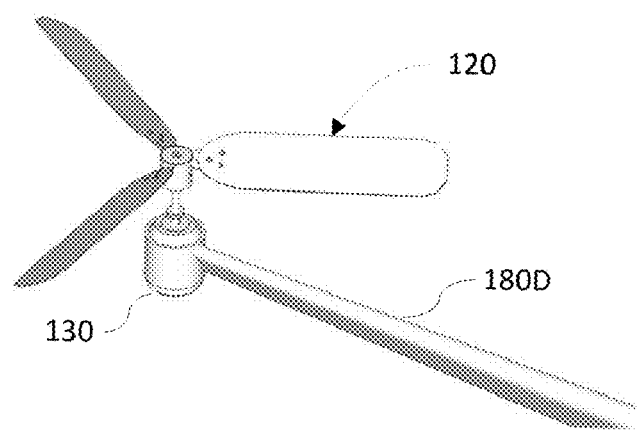

FIGS. 6A-6B show an embodiment using a HAWT with auxiliary blade sets and motors mounted on each of the three blades of the HAWT to enhance its performance. This embodiment can be used to modify and improve existing HAWT in operation.

FIGS. 6C-6F show different variants of the embodiment using a HAWT shown in FIG. 6A with each blade of the HAWT as a mounting device. The number of auxiliary blade sets and motors, the number of blades of the HAWT used as mounting devices, as well as the mounting positions of the auxiliary blade sets and motors are varied. This embodiment can be used to modify and improve existing HAWT in operation.

Figure 7:
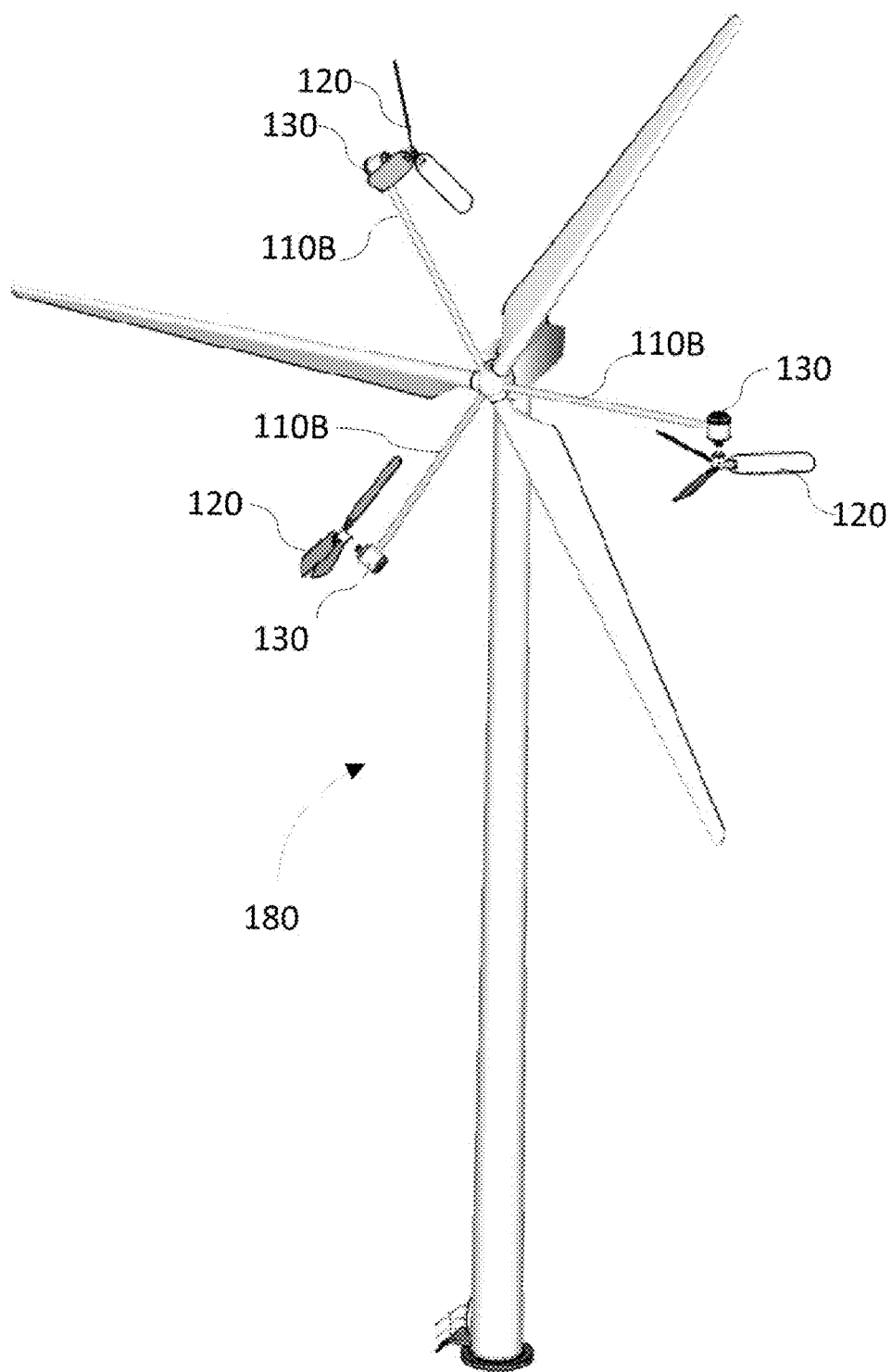

FIG. 7 shows an embodiment using a HAWT with three additional arms extending out from the nose cone to serve as mounting device for auxiliary blades sets and motors. The blades of the wind turbine and three additional arms are equidistant from each other. This embodiment can be used to modify and improve existing HAWT in operation.

Figure 8:
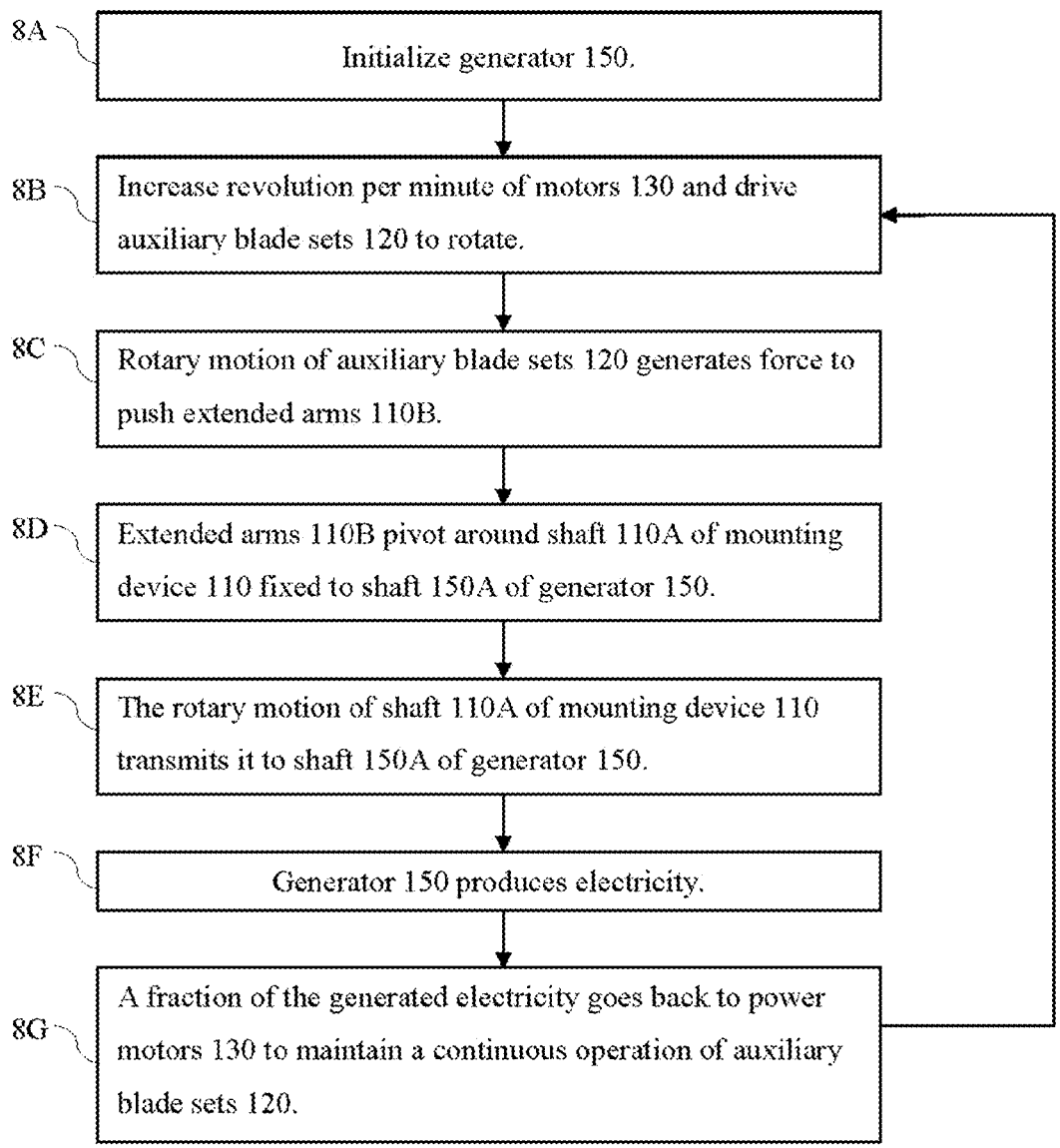

FIG. 8 shows the operation method of first embodiment implemented with a general generator.

Figure 9:
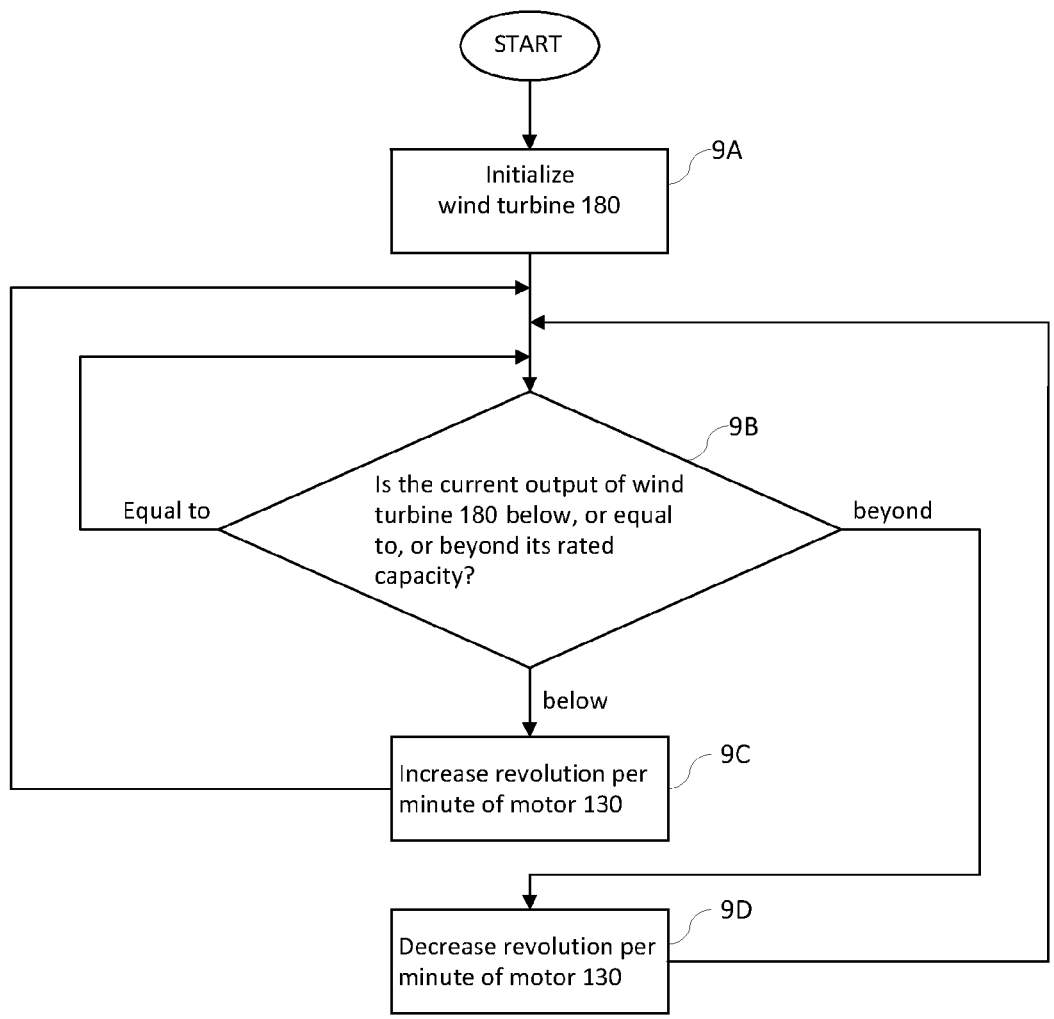

FIG. 9 shows the operation method of alternative embodiments implemented with wind turbines.

REFERENCE NUMERALS

Mounting device 110, 110'
Shaft of mounting device 110A
Extended arm of mounting device 110B
Suspension cable of mounting device 110C
Connecting circle of mounting device 110D
Auxiliary blades/auxiliary fan 120
Motor 130
Horizontal base 140
Generator 150
Shaft of generator 150A
Transmission shaft 152A, 152B, 152C
Gear 160A, 160B, 160C, 160D
Chain 170
Horizontal axis wind turbine (HAWT) 180
Tower of HAWT 180A
Nose cone of HAWT 180B
Nacelle of HAWT 180C
Blade of HAWT 180D
Vertical axis wind turbine (VAWT) 190

DETAILED DESCRIPTION

Figure 1A:
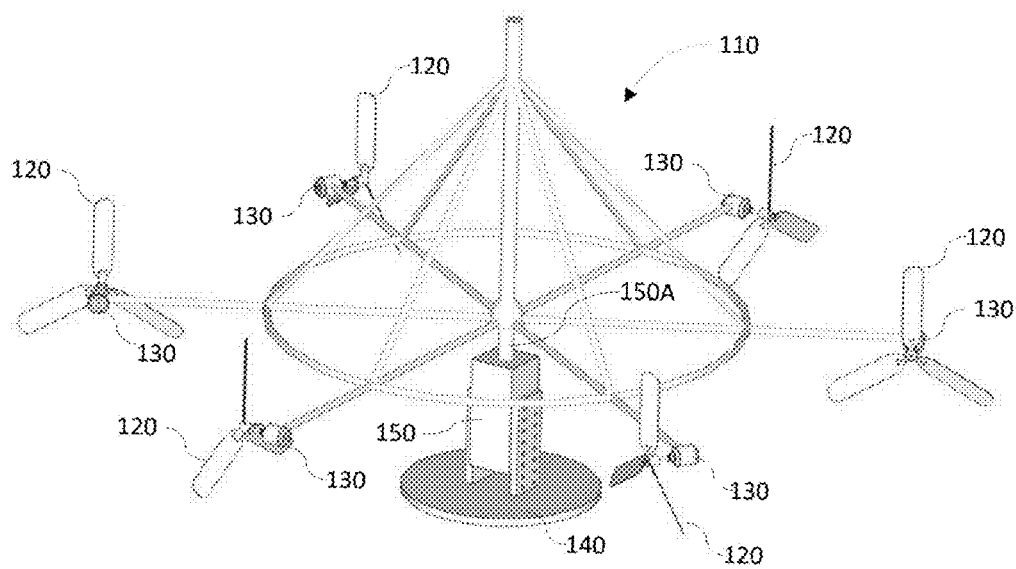
FIGS. 1A-1C show an embodiment of a continuous wind power system with auxiliary blades using a general generator and six auxiliary blade sets. This embodiment can be used to build wind turbine alternatives.
Figure 1B:
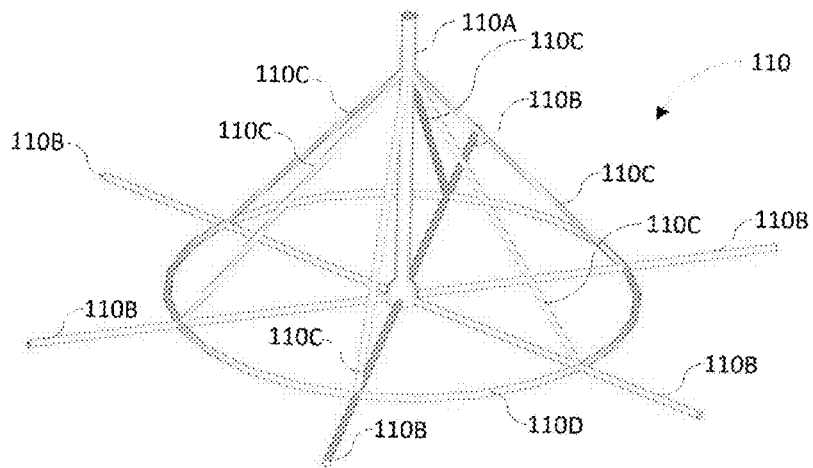
Figure 1C:
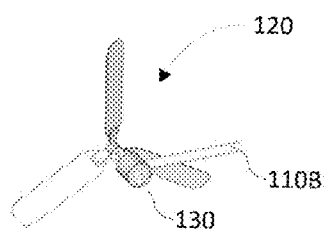

First Embodiment—FIGS. 1A, 1B, and 1C

FIG. 1A shows an embodiment that comprises of three major components: a kinetic energy producing component, a power generating component, and a transmission component that transfers the kinetic energy to the power generating component. In this embodiment, the kinetic energy producing component comprises of six auxiliary blade sets 120 and six motors 130 and the power generating component is generator 150. A mounting device 110 works as the transmission component. FIG. 1B shows the lone structure of a mounting device 110. FIG. 1C shows an enlarged view of one auxiliary blades set 120 and one motor 130 mounted at one of six extended arms 110B of mounting device 110.

As illustrated in FIG. 1B, mounting device 110 has a number of connecting and supportive structures fixed to and extends from shaft 110A. First, there are six extended arms 110B radiating out perpendicularly from the lower end of shaft 110A, with 60 degrees of separation between each consecutive arms 110B. Each extended arm 110B provides a rigid area of sufficient size for mounting an auxiliary blade set 120 and a motor 130. For added support, suspension cable 110C extends from a higher point on shaft 110A and connects to each extended arm 110B so that the angle between each suspension cable 110C and each extended arm 110B is 45 degrees. Each jointing point between the suspension cable 110C and the extended arm 110B are then connected with such points in adjacent arms to result in circle 110D. Circle 110D provides an even support to each extended arm 110B and thus contributes to further stabilization of the overall structure of mounting device 110.

FIG. 1C shows an enlarged view of auxiliary blade set 120 and motor 130 mounted at one of six extended arms 110B of mounting device 110. In this embodiment, auxiliary blade set 120 consists of three blades joined at a shaft, which is then fixed to the shaft of the motor 130. Motor 130 is mounted directly on the end of extended arm 110B using a fixing agent such as glue, rope, cable, or a type of mold made of metal or otherwise solid. Auxiliary blade set 120 and motor 130 are mounted orthogonally at the furthest end of extended arms 110B, so that the swiping area of auxiliary blade set 120 is parallel to shaft 110A as well as the extended arm 110B on which is it mounted.

FIG. 1A shows how mounting device 110, generator 150, and auxiliary blade sets 120 with motors 130 are connected. Generator 150 is mounted with its shaft vertical to a horizontal base 140. Mounting device 110 is placed directly on top of generator 150 so that shaft 110A of mounting device 110 is fixed to shaft 150A of generator 150.

In this embodiment, shaft 110A of mounting device 110 is fixed to shaft 150A of generator 150. Therefore shaft 110A works not only as a pivoting point for mounting device 110, it also works as a transmission device to transfer the rotary motion produced by the torque produced by auxiliary blade sets 120 activation.

Rechargeable batteries, solar panels, or a fraction of power generated by generator 150 can be used as a source of electrical energy to power up motor 130. When motor 130 is initialized, it converts electricity into kinetic energy, manifested by the rotation of auxiliary blade set 120. Rotating auxiliary blade set 120 generates a force to push the extended arm 110B from where auxiliary blade set 120 is mounted.

In the embodiment, when all six motors 130 are initialized by input electricity, all six sets of auxiliary blades 120 start rotating and generating force to push extended arm structures 110B. Such force causes revolving of the mounting device 110 around shaft 110A and providing torque to shaft of generator 150A. This way, generator 150 is driven to generate power.

Additional Embodiments with General Generator

FIGS. 1D-1G, FIGS. 2A-2E

Figure 1D:
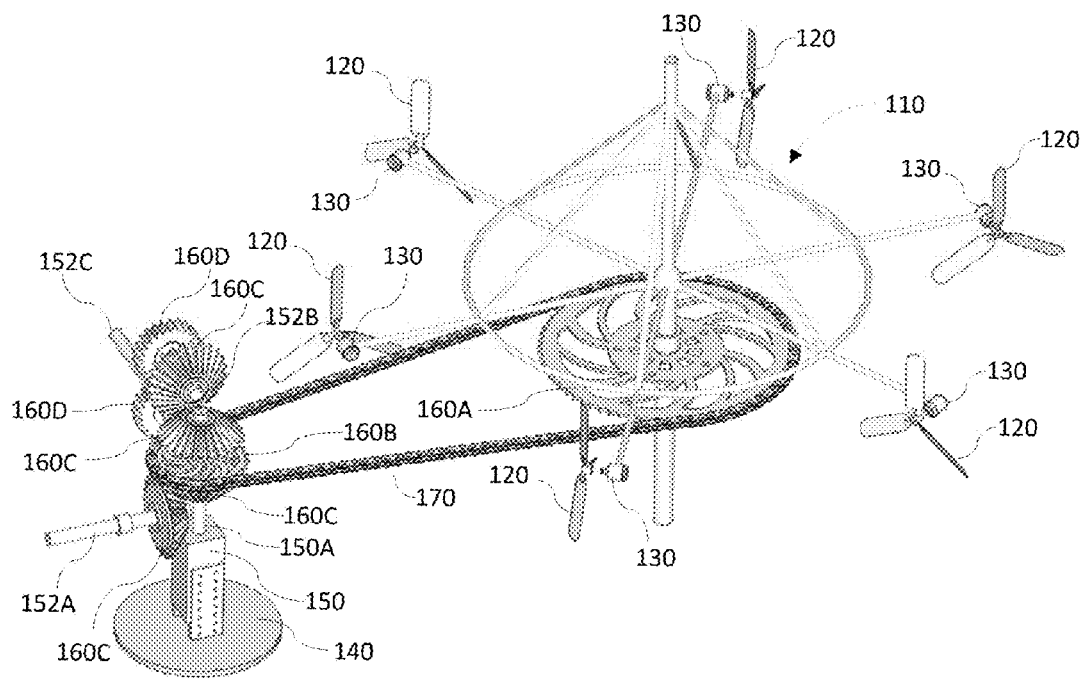
FIGS. 1D-1G show a variation of the embodiment shown in FIGS. 1A and 1B with an additional transmission device. This embodiment can be used to build wind turbine alternatives.
Figure 1E:
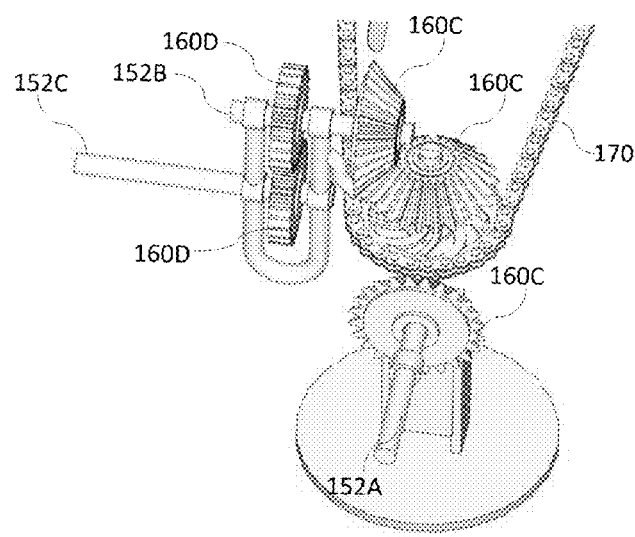
Figure 1F:
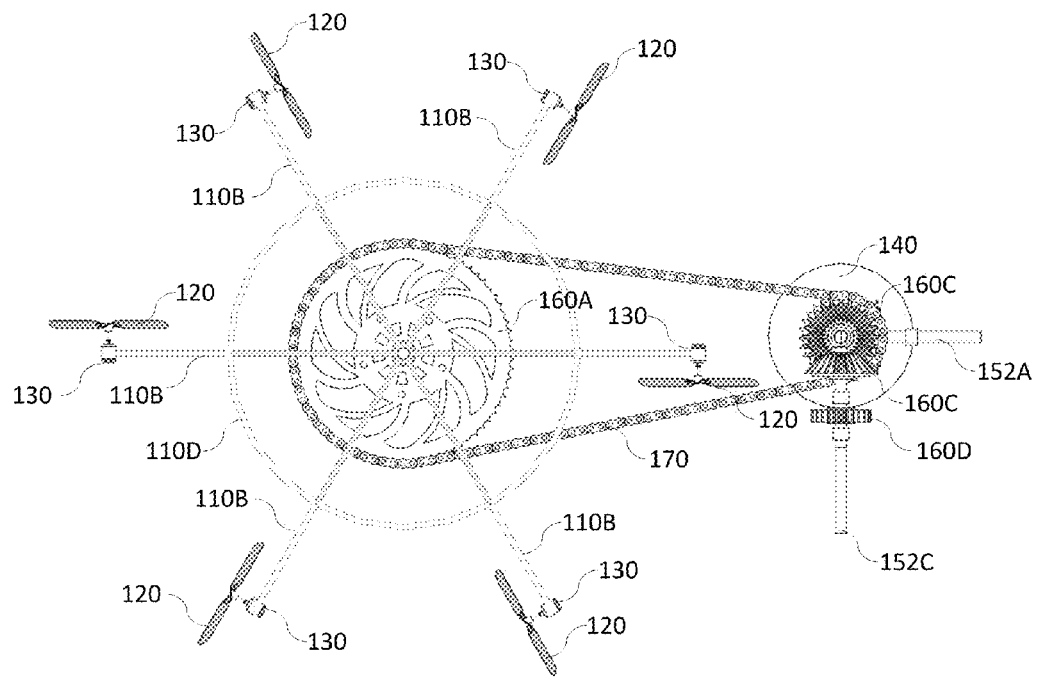
Figure 1G:
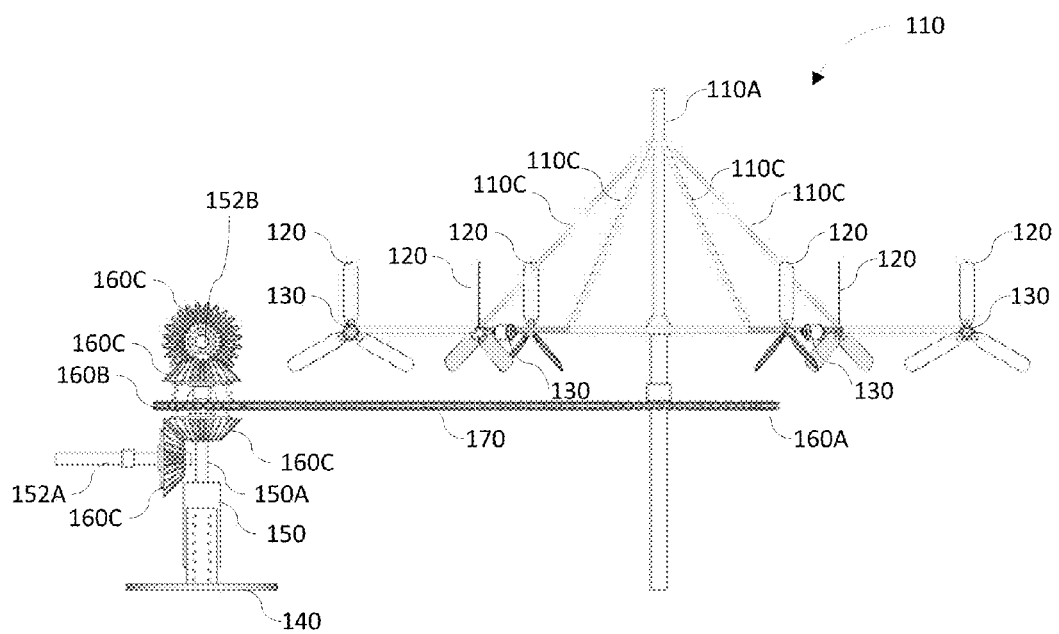

FIGS. 1D-1G show a variation of the first embodiment, with the same kinetic energy producing component and power generating component, but with a more elaborate transmission device comprising of several gears and a chain. FIG. 1D is a perspective view; FIG. 1E is an enlarged view of a part of the transmission component; FIG. 1F and FIG. 1G are a top view and the side view of the embodiment, respectively.

There are two reasons to include a separate transmission component here. The first reason is general. Usually the power generating component requires a relatively high revolution per minute (RPM) to reach its rated output. However, the RPM provided by the kinetic energy producing component is often not high enough. Therefore a transmission component is needed to act as an accelerator between the kinetic energy producing component and the power generating component. The second reason is specific to this and similar embodiment. When a large mounting device is built to accommodate more auxiliary blades and motors driving the blades, we need to deploy multiple generators using one mounting device to improve the compound energy output.

In this additional embodiment shown in FIGS. 1D-1G, the general set up for mounting device 110, auxiliary blade sets 120, motors 130, and generator 150 is the same as that of the first embodiment. However, mounting device 110 stands separately from generator 150. As such, a separate transmission device is used to transfer torque from mounting device 110 to generator 150.

From FIG. 1D, the prospective view and FIG. 1F, the top view, it is easy to see that gear 160A is a large driver gear that is fixed directly to shaft 110A of mounting device 110. Therefore, when shaft 110A turns, it drives gear 160A to also turn at the same RPM as shaft 110A, which in turn drives chain 170 to move. Chain drive 170 provides an easy way of transmitting rotary motion from one gear to another over any distance. Gear 160B is a smaller gear fixed directly to shaft 150A of generator 150 and it is driven round by chain 170. Gear 160B in turn drives round shaft 150A of generator 150.

One of the key features of the gear system described above is the fact that gear 160A has a larger radius than gear 160B. Therefore shaft 150A of generator 150 turns at a higher RPM than shaft 110A, effectively accelerating RPM of mounting device 110 to meet rated RPM of generator 150.

The sizes of gear 160A and 160B depend directly on the ratio between RPM of the mounting device 110 and the rated RPM of generator 150. For example, if mounting device 110 rotates at 1000 RPM and generator 150 requires 5000 RPM as its rated RPM, then the radius of gear 160B is ⅕ of radius of gear 160A.

From FIG. 1G, the side view, it is shown that in this embodiment, there are two additional 45 degree angled straight bevel gears 160C also fixed directly on shaft 150A of generator 150 in a way gear 160 B is sandwiched by the two broader surfaces of gears 160C. Therefore, when shaft 150A rotates, both gears 160C are driven to turn. When the gear 160C installed at a lower position on shaft 150A turns, it drives another gear 160C fixed on transmission shaft 152A to turn, which in turn drives transmission shaft 152A to turn.

In FIG. 1D, we can see that when bevel gear 160C installed above gear 160B is driven to turn by shaft 150A, bevel gear 160C mounted on transmission shaft 152B is driven to rotate, which in turn drives transmission shaft 152B.

In FIG. 1E, we can see that shaft 152B pass the torque to the spur gear 160D fixed to it and that spur gear 160D pass the motion to its adjacent spur gear 160D installed on transmission shaft 152C to make it rotate.

Thus, transmission shafts 152A, 152B, and 152C may be further connected to additional generators (not illustrated in figures). Accordingly, such gear systems may be used to increase compound energy output of the continuous wind power system by transmitting initial kinetic energy to more than one power generator.

Figure 2A:
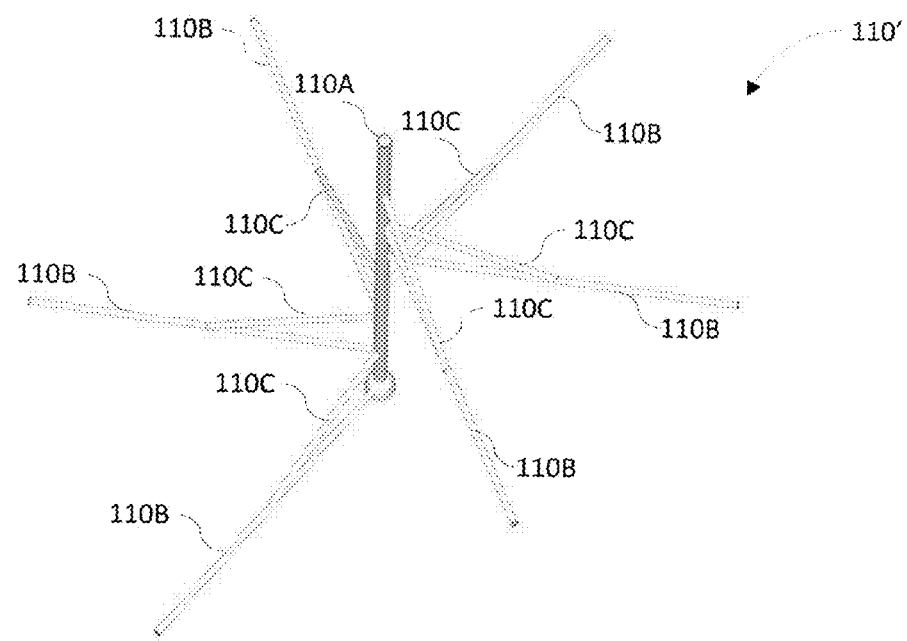
FIGS. 2A-2B show a variation of the embodiment shown in FIGS. 1A and 1B with different arrangement of auxiliary blade sets. This embodiment can be used to build wind turbine alternatives.
Figure 2B:
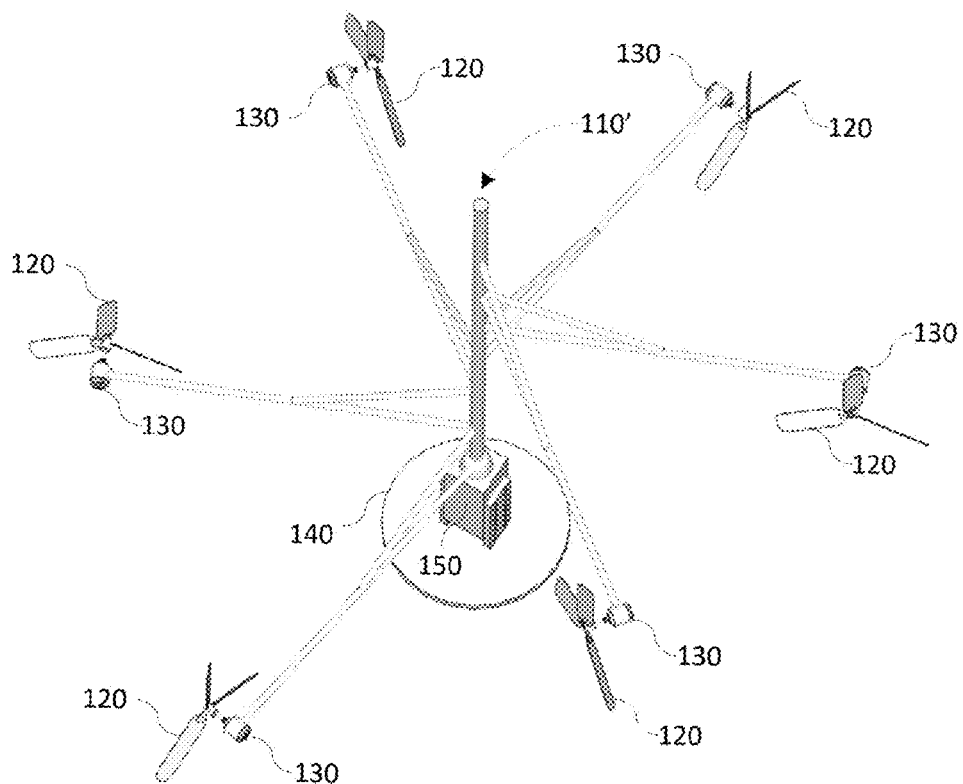

FIGS. 2A and 2B show a variant of embodiment shown in FIGS. 1A and 1B using a different mounting device 110' for auxiliary blade sets 120 and motors 130. FIG. 2A shows the lone structure of mounting device 110'. In this embodiment, radiating out from shaft 110A, six extended arms 110B are fixed at different elevation and each extended arms are stabilized by suspension cable 110C extending out from higher points on shaft 110A. An auxiliary blade sets 120 and a motor 130 is mounted on the outer end of each of the extended arm 110B. The mounting device 110' is placed directly on top of generator 150 so that the generator shaft 150A is fixed to the shaft of mounting device 110A. Activation of motors 130 and auxiliary blade sets 120 results in pivoting of both shafts 150A and 110A just as in FIG. 1A.

Figure 2C:
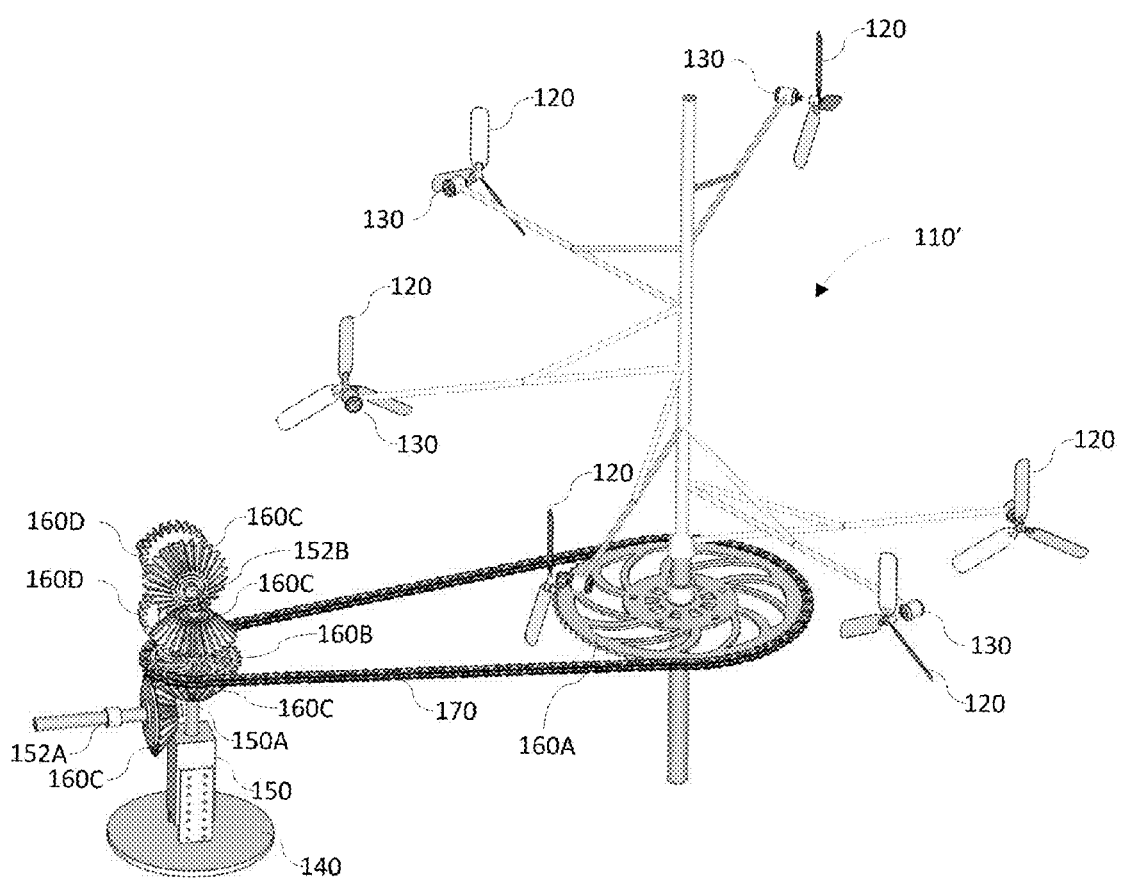
FIGS. 2C-2E show a variation of the embodiment shown in FIGS. 2A and 2B with an additional transmission device. This embodiment can be used to build wind turbine alternatives.
Figure 2D:
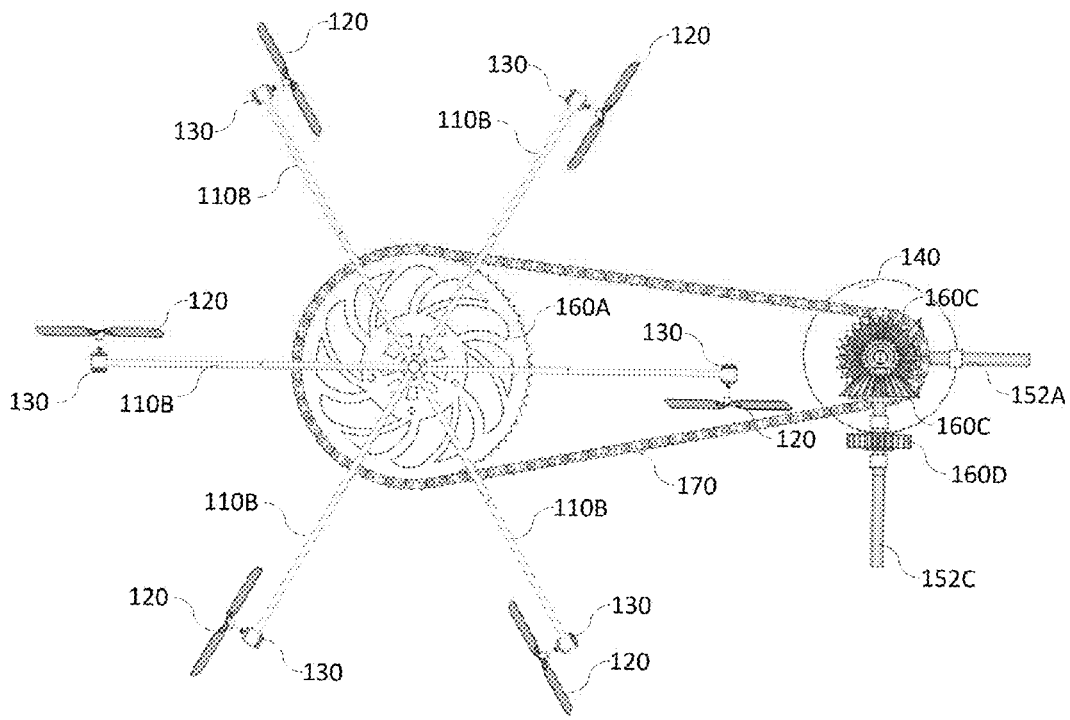
Figure 2E:
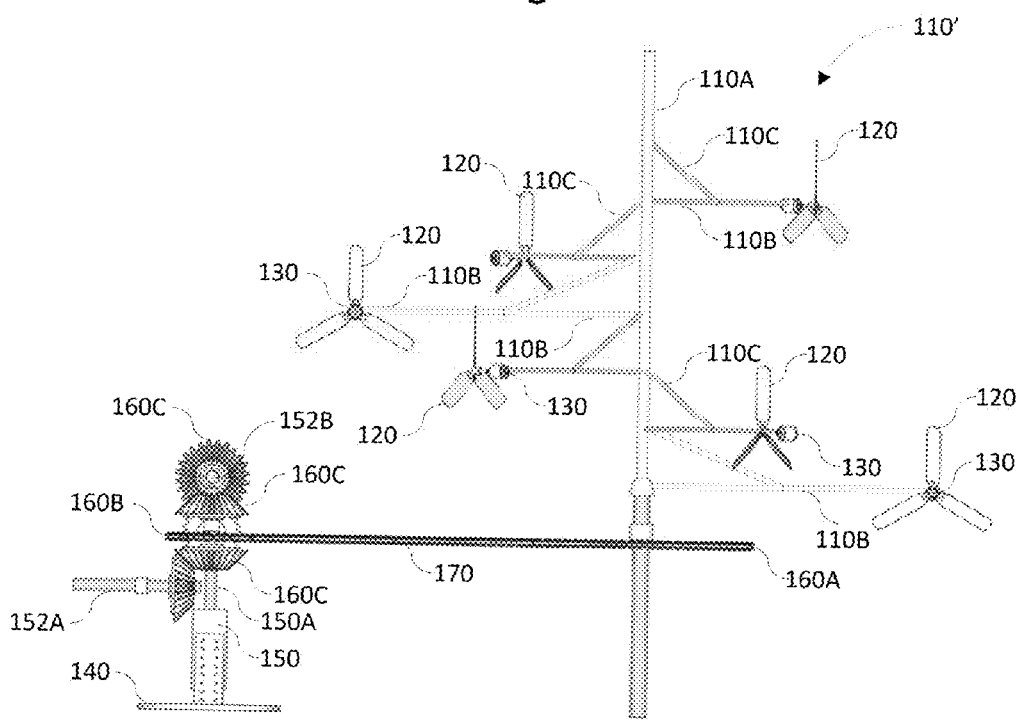

FIGS. 2C-2E show a variation of embodiment described in FIG. 2A-2B that uses a transmission device comprising of several gears and a chain. The structure and operation of such transmission device is identical to that of the embodiment shown in FIG. 1D-1G. The structure of its mounting device for auxiliary blades 120 and motors 130 is the same as shown in FIG. 2A. FIGS. 2C, 2D, and 2E are the perspective view, the top view, and the side view, respectively.

So far, all embodiments discussed above can be used to build wind turbine alternatives. A clear advantage of embodiments illustrated in FIGS. 1A-1G and FIGS. 2A-2E is that a wind turbine is not a necessary component for generating electricity. Such embodiments can provide a cheaper and quicker alternative to the traditional wind farm. It is known that for the same output capacity, a wind turbine is usually ten times as expensive as a general generator. Having the option of using a general generator can therefore decrease ten-fold the cost of building a power generation plant. Also, if readily-available general generator can be used instead of having to wait for wind turbine production, time may also be saved.

Alternative Embodiment

FIGS. 3, 4A-4C, 5, 6A-6F, 7

As described in the first embodiment, three major components—a kinetic energy producing component, a power generating component, and a transmission component that transfers the kinetic energy to the power generating component—are needed to build any power generating system. A traditional wind turbine encapsulates many of those components such as blades as kinetic energy producing unit, a generator as a power generating unit, and a gear box enclosed in the nacelle as a transmission/acceleration unit.

Therefore existing wind turbines make good options as parts to build a continuous wind power system. The efficiency of a traditional wind turbine will be significantly increased by turning existing wind turbine into a continuous wind power system.

Figure 3:
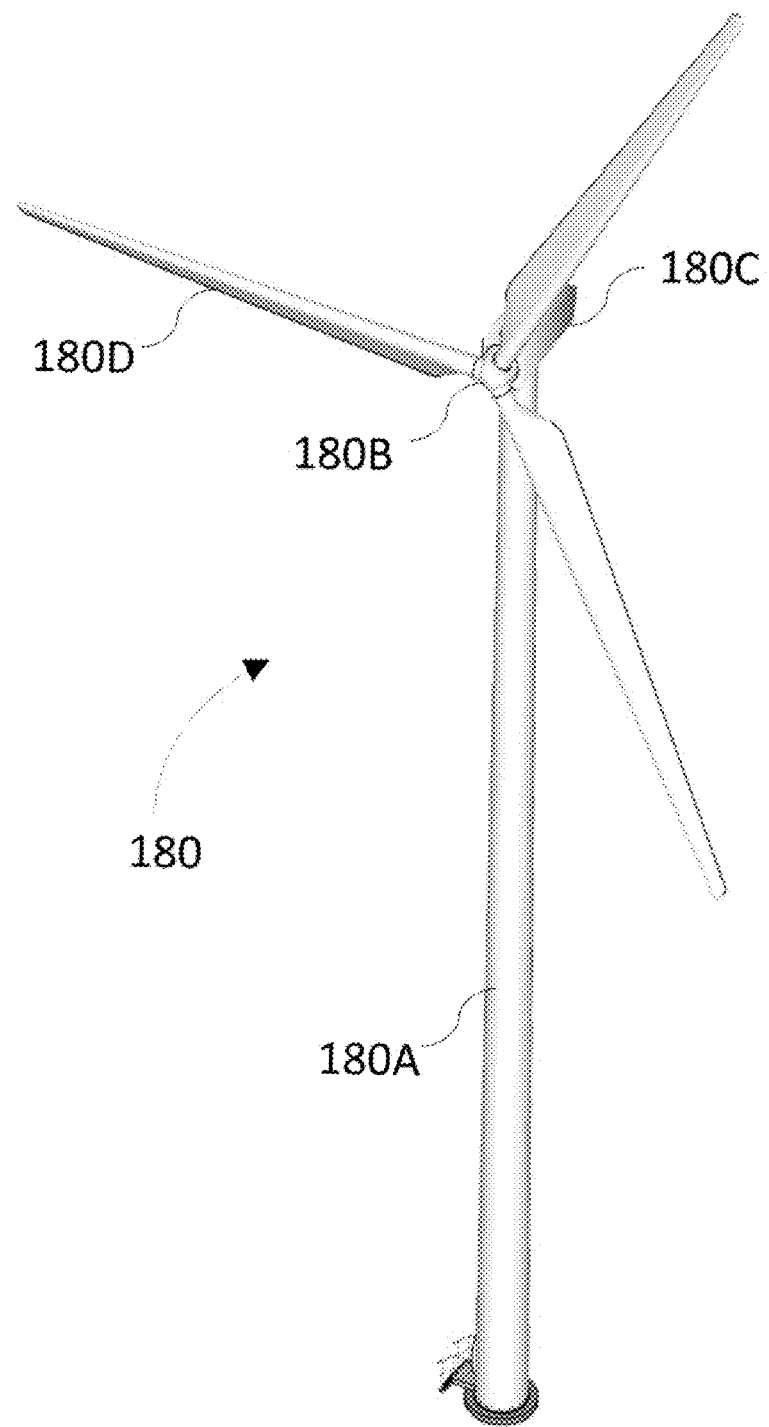
FIG. 3 shows a traditional horizontal axis wind turbine (HAWT) structure.

FIG. 3 shows a traditional HAWT 180 comprising of a tower 180A, a nose cone 180B, a nacelle 180C, and three blades 180D. When natural wind is available to meet its cut-in speed, three blades 180D start to pivot around nose cone 180B and provides kinetic energy that is to be converted to electricity by a generator encapsulated within nacelle 180C.

FIGS. 4A-4C show embodiments implemented with a HAWT 180. However, not every part of HAWT 180 is used for these embodiments. Nacelle 180C of wind turbine 180 is vertically mounted on a horizontal base 140 directly instead of on top of the tower of HAWT 180A.

In FIG. 4A, all three blades 180D are used. Each blade 180D is modified with the use of one auxiliary blade set 120 and one motor 130. Auxiliary blade sets 120 and motors 130 are mounted on every blade 180D, so that when motors 130 are initialized, auxiliary blade sets 120 starts rotating and generating forces to push blades 180D to pivot around nose cone 180B. Then the generator contained within nacelle 180C converts the kinetic energy to electricity. The swiping area of blade 180D is horizontal and the swiping area of auxiliary blade set 120 is vertical. The resulting force from auxiliary blade sets 120 is horizontal and perpendicular to blade 180D, pushing blades 180D to rotate around nose cone 180B. Thus, in this embodiment, natural wind is not necessary. Rather, necessary wind is produced by the auxiliary blade sets 120.

FIG. 4B is a variant of embodiment in FIG. 4A where only one blade 180D is modified with an auxiliary blade set 120 and a motor 130.

FIG. 4C shows another variant of embodiment of FIG. 4A, with the outer end of each of the three blades 180D sandwiched by two sets of auxiliary blades 120 powered by a single motor 130.

All the above embodiments shown in FIG. 4A-4C can be used to build wind turbine alternatives using existing HAWTs. Two noticeable advantages of this embodiment over traditional HAWT are that it saves installation cost and it saves space. There is no need to lift the nacelle and blades to a considerable height and mount them onto a tower. Using this set up, an alternative wind farm consisting of a multi-floor building can be built, accommodating one or more wind turbines on each floor.

From this point on, alternative embodiments using existing wind turbines are discussed. The following embodiments can be used to modify wind turbines in operation to improve their performance.

FIG. 5 shows an embodiment implemented with a VAWT 190. One auxiliary blades set 120 and a motor 130 are mounted at the mid-point of one of the three blades of VAWT 190.

FIG. 6A shows an implementation with a HAWT 180 with auxiliary blades sets 120 and motor 130 mounted on outer end of each blade 180D. HAWT 180 is installed with its tower 180A. This embodiment can be used to modify and improve existing HAWT in operation.

FIG. 6B is an enlarged view of auxiliary blade set 120 and motor 130 mounted on the end of blade 180D in the same fashion as described in FIG. 1C. The swiping area of auxiliary blade set is parallel to blade 180 on which it is mounted, so that when propelled by motor 130, it generates force to push blade 180 to rotate around nose cone 180B.

FIGS. 6C-6F show different variants of the embodiment shown in FIG. 6A using a HAWT.

Figure 6C:
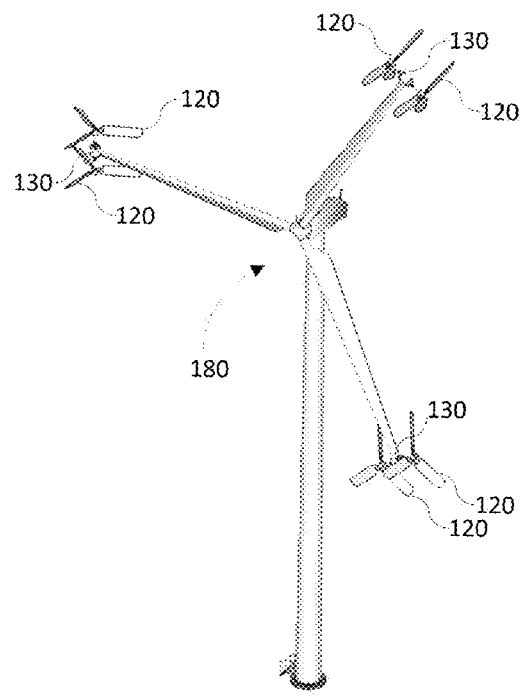

FIG. 6C shows an embodiment with the outer end of each of the three blades 180D sandwiched by two sets of auxiliary blades set 120 that are powered by a single motor 130.

Figure 6D:
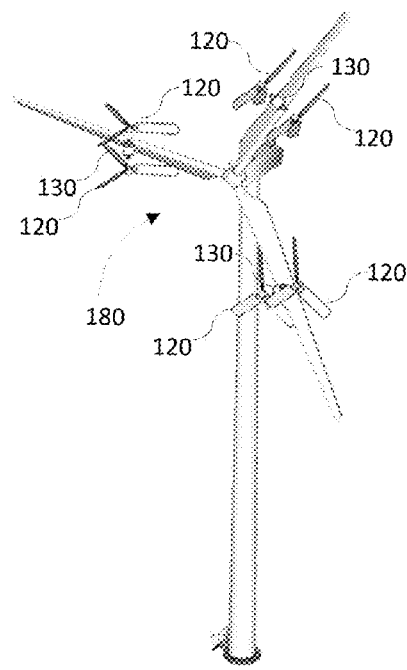

FIG. 6D shows a variant embodiment of FIG. 6C where each of the three blades 180D is sandwiched by two sets of auxiliary blades set 120 that are powered by a single motor 130 at the mid-point of the length of blade 180D instead of at its outer end.

Figure 6E:
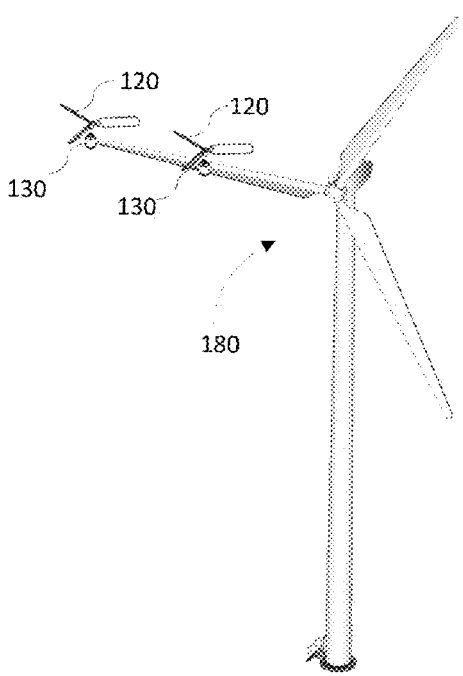

FIG. 6E shows an embodiment with one auxiliary blades set 120 paired with one motor 130 installed at both outer end point and mid-point of only one of the three blades 180D.

Figure 6F:
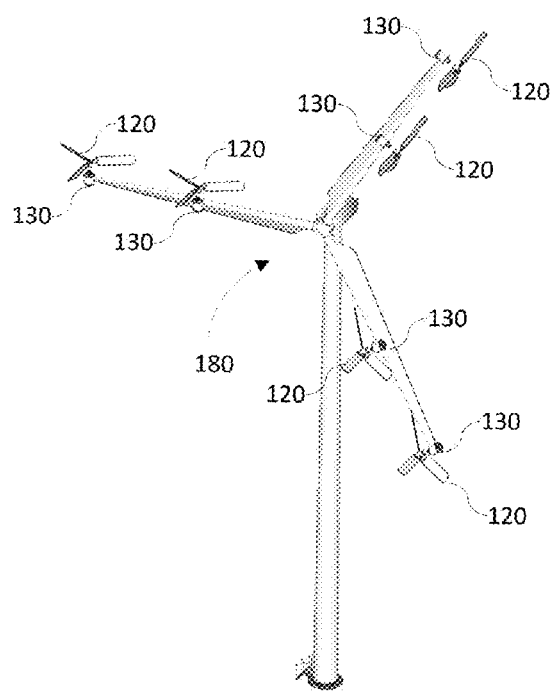

FIG. 6F is a variant embodiment of FIG. 6E where all three of the blades 180D are modified instead of one. Each auxiliary blades set 120 and motor 130 are installed at both outer end point and mid-point of each of the three blades 180D.

FIG. 7 shows an embodiment implemented by HAWT with three extended arms 110B mounted directly on the nose cone 180B of HAWT 180 to serve as mounting device for auxiliary blade sets and motors. Three blades 180D of the HAWT 180 and three extended arms 110B are alternating in its arrangement and there is an equidistant separation between each fixture. Auxiliary blade sets 120 and motors 130 are mounted on the outer end of extended arms 110B instead of on blades 180D of HAWT 180.

In all the above embodiments, even though there are a lot of choices for motor 130, a low voltage direct current motor is a preferable candidate. The voltage can be ranged from 12V to 48V; the RPM can range from 1750 to 5500; the horse power can range from one fourth to two horse power.

Such a low voltage direct current motor is safer than other types of motor during severe weather conditions as storm or hurricane. Its performance is stable even when the surrounding air current brings resistance to the set of auxiliary blades it propels. A direct current motor is powerful in terms of its short acceleration period.

For example, a two horse power 48V direct current motor with 1800 RPM can weigh as light as 44 pounds. This kind of motor is good enough to be used with a generator with capacity of over 1.0 MW wind turbines according to this embodiment.

Motor 130 can be powered up by using rechargeable batteries, solar panels, or a fraction of power generated by wind turbine 180 as a source of electrical energy. Also, the size of the blade in auxiliary blade set 120 does not necessarily need to grow together with the size of wind turbine 180. For any wind turbine larger than 1.0 MW, 70 cm is an adequate length for one auxiliary blade.

Motor 130 is connected to the control box and break system of wind turbine 180, contained within nacelle 180C. Therefore, one can initialize motor 130 from the control box of wind turbine 180 when natural wind available is below the cut-in speed for HAWT operation. Also, during severe weather conditions such as storm or hurricane when the speed of natural wind available reaches the cut-off speed for HAWT operation, the break system gets turned on, which in turn will turn off motor 130 automatically.

Operation of the First Embodiment

Referring to FIG. 8, a flow diagram illustrating a method of operating the first embodiment of a continuous wind power system with auxiliary blades using general generator is shown.

In step 8A, generator 150 is first enabled and initialized. In step 8B, the system powers up and increases RPM of motors 130 to make auxiliary blade sets 120 rotate. In step 8C, the rotary motion of auxiliary blade sets 120 generates force to push extended arms 110B to move. In step 8D, the force generated by auxiliary blades sets 120 results in rotary motion of shaft 110A of mounting device 110 fixed to shaft 150A of generator 150. In step 8E, the rotary motion of shaft 110A of mounting device 110 results in transmitting the rotary motion to shaft 150A of generator 150. In step 8F, generator 150 produces electricity. In step 8G, a fraction of the generated electricity goes back to power motors 130 to maintain continuous operation of the auxiliary blade sets 120.

When auxiliary blade sets 120 are in motion, they assist each extended arm 110B to move in a direction opposite to that of the force it creates. The amount of force required to overcome static friction to make a stationary object move is greater than the force required to overcome the kinetic friction to make a moving object continue in its movement. By the same token, once mounting device 110 or 110' gets in motion, it will take less energy to keep it at an optimum RPM than to kick it off time to time from its stationary status.

Operation of Alternative Embodiments

FIG. 9

Referring to FIG. 9, a flow diagram illustrating a method of operating the alternative embodiments of a continuous wind power system with auxiliary blades using wind turbines is shown. The embodiments are shown in FIG. 5, FIG. 6A-6F, and FIG. 7.

In step 9A, wind turbine 180 is first enabled and initialized. In step 9B, the output level of wind turbine 180 is continuously monitored. If the output level of wind turbine 180 is equal to its rated capacity, the system just runs as it does; In step 9C, if the output level of wind turbine 180 is below its rated capacity, the system powers up and increases RPM of motors 130 to make auxiliary blade sets 120 generate additional force to push blades 180D to move; if the output level of wind turbine 180 is beyond its rated capacity, the system decreases the RPM of motors 130 to weaken the force generated by auxiliary blade sets 120. The goal of the operation method is to stabilize the output level of wind turbine 180 to its rated capacity.

When auxiliary blade sets 120 are in motion, they generate force to assist each blade 180D to move in a direction opposite to that of the force it creates. As it is easier to overcome the kinetic friction to keep object in its motion than to overcome static friction of a stationary object, a wind turbine that is kept in motion is substantially more sensitive to capture any natural wind and thus is more efficient.

When an embodiment of continuous wind power system is used as modification to an existing wind turbine, for safety reasons the auxiliary blades system must be compatible with the break system of the wind turbine in operation. Thus, when the natural wind speed is greater than the cut-off speed of wind turbine 180, the control system of wind turbine 180 automatically turns off wind turbine 180. As motors 130 are connected to the control system of wind turbine 180, motors 130 are also stopped whenever the break of wind turbine 180 is on.

ADVANTAGES

From the detailed description above, a number of advantages of using any of many embodiments of my continuous wind power system with auxiliary blades become evident.

(a) Wind turbines are growing huge and expensive. However, each wind turbine operates during only a small fraction of a day. Using auxiliary blades to keep wind turbine in motion, we can solve many of aforementioned problems. By largely improving the efficiency of existing wind turbine, more energy will be available for use without increasing cost, dramatically shortening the recoup period of an investment.

(b) It is easy and cheap to implement. Wind turbine is simply put a fancy combination of a generator with a set of acceleration and transmission devices, plus blades to capture kinetic energy from wind. It is usually much more expensive than a general generator of the same capacity. Using our invention, an investor who wants to start a new wind farm, he does not have to invest in expensive wind turbines. Generators are functionally good and cheap to acquire, and so are auxiliary blades sets and motors, compared to the current market price for a complete wind turbine. For investors with existing wind farm, the modifying cost is low and the time required is short to complete the modifying project as both auxiliary blades and motors are easy to find and easy to install on blades of existing wind turbines. With the minor modifications of their wind turbines, the investors will see a significant increase in efficiency and profit from their existing wind farm operation.

(c) Some embodiments largely free wind turbine from the weather and location constraints. By increasing the sensitivity of turbines to natural wind available and therefore increase efficiency, the continuous wind power system can be set up in previously undesirable location such as deserts.

(d) It provides a way to build wind turbine alternatives, which is cheaper, smaller, and less dependent on locations while maintaining to be just as powerful as existing wind turbines. By reducing the physical size of the overall structure of the wind turbines, it is also possible to house the continuous wind power system with auxiliary blades indoors. We may even be able to encapsulate a mini-wind farm into individual buildings so to increase accessibility and further promote wind energy in our daily lives.

(e) Wind energy is clean, sustainable energy. By making wind energy accessible and affordable, we can adequately support growing demand for energy all awhile protecting the environment from harmful byproducts of common energy sources of today such as oil, gas, and coal.

CONCLUSION, RAMIFICATION, AND SCOPES

Although the description above contains many specifics, these should not be construed as limiting the scope of the embodiments but as merely providing illustrations for a few embodiments of numerous possibilities.

For example, when the continuous wind power system is implemented with a wind turbine, auxiliary blade set can be installed at points of blade of wind turbine other than end point or mid-point using various fixing agents such as rope, glue, cable, or a type of mold or casting made of metal or otherwise solid. Each auxiliary blade set can have one, two, three, or even more blades, and each blade of wind turbine can have one or multiple sets of auxiliary blades mounted.

When the continuous wind power system is implemented with a general generator, various materials can be used to build extended arm pieces, use one or multiple extended arms, and replace suspension cable with a connecting arm or a beam. It is possible to have multiple groups of auxiliary blade set and motors on different planes and points on extended arms, and install one or more auxiliary blades sets and motors on each extended arms. One or more gears, belts, and chain systems may be used together or exclusively to make the transmission device, to which one or more generators may be connected to maximize output from a single source of kinetic energy.

In both cases, the shafts of motors may be aligned to be parallel or perpendicular to the shaft of the mounting device for auxiliary blades and motors. Auxiliary blade sets may be connected to motors remotely placed by using a transmission device using one or more gear, belt, and chain systems. The auxiliary blade sets that are powered by these motors may have horizontal or vertical swiping plane.

Thus the scope of the embodiments should be determined by the appended claims and their legal equivalents, rather than by the examples given.

I claim:

1. A continuous wind power system with auxiliary blades, comprising:
    one or more auxiliary blade sets:
    a mounting device having a central shaft and one or more connecting parts radiating from the central shaft of the mounting device, the one or more connecting parts providing a rigid area of sufficient size for mounting the one or more auxiliary blade sets,
        each auxiliary blade set comprising one or more blades rotatably mounted to a shaft, such that a rotation of each of the auxiliary blade sets generates a force parallel to its respective shaft, each auxiliary blade set mounted to the one or more connecting parts by its respective shaft; and
    one or more motors connected to each auxiliary blade set and mounted on one of the connecting parts on a rear side of each auxiliary blade set, each motor having a motor shaft centrally aligned with a same axis of the shaft of its respective auxiliary blade set; and
    a generator connected to the central shaft of the mounting device and powered by the torque of the central shaft of the mounting device resulting in part from the force generated by the rotation of the one or more auxiliary blade sets.

2. The continuous wind power system with auxiliary blades according to claim 1, wherein the central shaft of the mounting device is fixed to a shaft of the generator and directly transfers the torque of the one or more auxiliary blade sets to the shaft of the generator.

3. The continuous wind power system with auxiliary blades of claim 1, further including a separate transmission component that transfers the torque of the central shaft of the mounting device to a shaft of the generator.

4. The continuous wind power system with auxiliary blades of claim 1, wherein at least one of the auxiliary blade sets is propelled by its respective motor.

5. The continuous wind power system with auxiliary blades of claim 1, wherein at least one of the motors is powered by a source selected from the group consisting of batteries, solar panels and a fraction of power generated by the generator.

6. The continuous wind power system with auxiliary blades according to claim 1, wherein two of the connecting parts radiating from the central shaft are placed at a different elevation from each other along the central shaft, such that an auxiliary blade set mounted on each of the two connecting parts resides at the different elevation from each other along the central shaft.

7. A continuous wind power system with auxiliary blades, comprising:
   a wind turbine, without a traditional tower, having a housing encapsulating a generator of the wind turbine, the housing being mounted directly on a horizontal base rather than a tower, a central shaft of the generator extending vertically;
   one or more rigid extension parts radiating from the central shaft of the generator, such that a rotational swiping area of the one or more extension parts is horizontal, each of the one or more rigid extension parts are substantially parallel to a ground surface;
   one or more auxiliary blade sets comprising one or more blades rotatably mounted to a shaft, such that a rotation of each of the auxiliary blades generates a force parallel to its respective shaft and perpendicular to the central shaft, each auxiliary blade set mounted to at least one of the one or more extension parts by its respective shaft;
   one or more motors connected to each auxiliary blade set and mounted on one of the extension parts on a rear side of each auxiliary blade set, each motor having a motor shaft centrally aligned with the same axis of the shaft of its respective auxiliary blade set, and perpendicular to an axis of the central shaft; and
   the generator is powered by the torque of the central shaft resulting in part from the force generated by the rotation of the one or more auxiliary blade sets.

8. The continuous wind power system with auxiliary blades of claim 7, further comprising one or more turbine blades having a horizontal swiping area and substantially parallel to the ground surface, radiating from the central shaft, providing a rigid area of sufficient size for mounting the one or more auxiliary blade sets having the one or more motors.

9. The continuous wind power system with auxiliary blades of claim 7, wherein at least one of the auxiliary blade sets is propelled by its respective motor.

10. The continuous wind power system with auxiliary blades of claim 7, wherein at least one of the motors is powered by a source selected from the group consisting of batteries, solar panels and a fraction of power generated by the generator.

11. A continuous wind power system with auxiliary blades, comprising:
   a vertical axis wind turbine with one or more rigid extension parts mounted to a vertical central shaft, the vertical axis wind turbine having a set of primary vertical axis blades rotating about the vertical central shaft, and each of the primary vertical axis blades connected to one or more of the rigid extension parts;
   one or more auxiliary blade sets comprising one or more blades rotatably mounted to a shaft, such that a rotation of each of the auxiliary blades generates a force parallel to its respective shaft and perpendicular to the vertical central shaft, each auxiliary blade set mounted to at least one of the one or more extension parts by its respective shaft; and
   one or more motors connected to each auxiliary blade set; and
   a generator connected to and powered by the torque of the central shaft resulting in part from the force generated by the rotation of the one or more auxiliary blade sets.

12. The continuous wind power system with auxiliary blades of claim 11, wherein the one or more rigid extension parts comprises a combination of one or more turbine blades mounted to one or more connecting parts radiating from the central shaft.

13. The continuous wind power system with auxiliary blades of claim 11, wherein at least one of the auxiliary blade sets is propelled by its respective motor.

14. The continuous wind power system with auxiliary blades of claim 11, wherein at least one of the motors is powered by a source selected from the group consisting of batteries, solar panels and a fraction of power generated by the generator.

* * * * *